United States Patent [19]

Fio Rito et al.

[11] 4,205,613

[45] Jun. 3, 1980

[54] APPARATUS FOR PYROLYZING WASTE MATERIALS

[75] Inventors: William M. Fio Rito, San Diego; Ralph E. Kidd, Long Beach, both of Calif.

[73] Assignee: Pan American Resources, Inc., San Diego, Calif.

[21] Appl. No.: 886,807

[22] Filed: Mar. 15, 1978

[51] Int. Cl.² .............................................. F23G 7/00
[52] U.S. Cl. .................................... 110/246; 110/226; 110/229
[58] Field of Search ................ 110/226, 242, 246, 229

[56] References Cited

U.S. PATENT DOCUMENTS

| | | | |
|---|---|---|---|
| 2,274,780 | 3/1942 | Duerr et al. | 110/246 |
| 3,098,458 | 7/1963 | Lantz, Jr. | 110/242 |
| 3,707,129 | 12/1972 | Kawashimo et al. | 110/246 |
| 3,794,565 | 2/1974 | Bielshi et al. | 110/246 |
| 4,084,521 | 4/1978 | Herbold et al. | 110/242 |

Primary Examiner—Edward G. Favors
Attorney, Agent, or Firm—James E. Brunton

[57] ABSTRACT

An improved method and apparatus for pyrolyzing waste materials and recovering useful chemical and energy rich materials therefrom. The apparatus of the invention includes a specially designed, rotatable combustion chamber and embodies a highly novel means for withdrawing a portion of the combustion gases generated by the pyrolysis of the waste materials, mixing these gases with preheated air in carefully controlled proportions and then using the highly combustible gaseous mixture thus formed to sustain pyrolysis within the combustion chamber.

15 Claims, 8 Drawing Figures

APPARATUS FOR PYROLYZING WASTE MATERIALS

BACKGROUND OF THE INVENTION

1. Field of the Invention

The present invention relates generally to a method and apparatus for pyrolysis of waste materials. More particularly, the invention relates to a novel method and apparatus for pyrolyzing waste materials and recovering useful chemical and energy producing materials therefrom.

2. Discussion of the Prior Art

The search for new energy sources has become increasingly important due to the rapid rate of depletion of existing fossil fuels. One of the more promising sources of new energy is waste materials presently being discarded or destroyed. By techniques of pyrolytic decomposition, many types of waste materials can be converted into energy rich fuels such as combustible gases and char, or fuel carbon.

In the past, several types of devices for pyrolyzing refuse and other waste products have been suggested. Many of these devices have proved unworkable or economically unfeasible. Others, while feasible in concept have been proven to be inefficient and unreliable in continuous operation. Still others, while attractive in theory, have been shown to be too expensive to manufacture, install and operate.

Among the most successful prior art refuse conversion devices are the devices described in U.S. Pat. Nos. 2,886,122; 2,993,843; 3,020,212; and 3,098,458. The present invention constitutes an improvement upon certain of the devices described in these patents.

As will become apparent from the description which follows, several important improvements to the apparatus described in the aforementioned patents have been made. One such improvement relates to the novel method and apparatus for continuously withdrawing a portion of the combustion gases generated by the pyrolysis of the waste, precisely mixing these gases with preheated oxygen or air and then using the highly combustible gaseous mixture thus formed to pyrolyze the waste products continuously being introduced into the apparatus. This technique also minimizes condensation problems and the undesirable buildup of materials within the gas recovery and recycling sub-systems.

Another important improvement of the apparatus of the present invention relates to a novel high temperature, liquid medium sealing means for effectively sealing the combustion chamber of the apparatus to prevent undesirable leakage of air into the chamber and at the same time prevent the escape of combustion gases therefrom.

Still another important feature of the invention concerns a unique waste material distribution means for uniformly distributing within the combustion chamber waste materials being introduced into the apparatus.

The apparatus of the present invention, embodying the aforementioned improvements, for the first time enables the highly efficient, self sustaining, continuous processing of combustible materials under air tight conditions to economically produce highly useful chemical by-product materials as well as energy rich materials such as combustible gases and fuel carbon.

SUMMARY OF THE INVENTION

It is an object of the present invention to provide an improved method and apparatus for pyrolyzing waste material and recovering energy producing materials therefrom.

It is another object of the invention to provide a method and apparatus of the aforementioned character in which waste materials are efficiently and inexpensively converted into energy rich fuels such as combustible gases and fuel carbon and in which useful chemical by-products such as liquid cresotars are recovered.

It is another object of the invention to provide an improved apparatus as described in the preceding paragraphs which, once operating, is self sustaining and requires no outside energy sources for pyrolyzing the waste materials.

It is still another object of the invention to provide an apparatus of the character described in which combustible gases recovered from the combustion chamber of the apparatus are precisely mixed in a unique manner with preheated air drawn from atmosphere to produce a highly combustible gas which can be used to sustain the pyrolysis of the waste materials introduced into the apparatus.

It is another object of the invention to provide an apparatus as described in the preceding paragraph in which condensation and crust formation within the gas recycling system of the apparatus is carefully controlled.

It is still another object of the present invention to provide an apparatus of the character described in which the combustion chamber of the apparatus is effectively sealed against atmosphere by a highly novel liquid medium sealing means.

It is another object of the invention to provide an apparatus as previously descirbed in which the waste material introduced into the combustion chamber of the apparatus is uniformly distributed therewithin by a novel waste distribution subassembly.

It is yet another object of the invention to provide an apparatus as described in the preceding paragraphs which is sturdy, durable and efficient in operation and which is highly effective in recovering the greatest possible percentage of useable products from the waste material.

Finally it is an object of the invention to provide an apparatus of the class described which is inexpensive to manufacture, simple to operate and which can be operated on a substantially continuous basis with a minimum of problems and with little supervision.

These and other objects of the invention are realized by an apparatus and method for pyrolyzing waste materials and recovering useful, energy producing materials therefrom, comprising a housing, a rotatable combustion chamber mounted within the housing, a burner system for heating the chamber, a fixed waste inlet passageway mounted at a first end of the combustion chamber, a fixed outlet passageway mounted at a second end of the housing in communication with the combustion chamber, the improvement comprising a combustible gas recovery and recycling system for recovering combustible gases from the combustion chamber, controllably mixing a portion of the gases with air and supplying the gaseous mixture thus formed to the burner system, the gas recovery and recycling means comprising a gas intake receiving combustible gases generated by the pyrolysis of the waste material within the combustion chamber; an air intake for receiving air from atmosphere external to the apparatus; a gas mixing unit disposed intermediate of, and interconnected with the gas intake and air intake for controllably mixing the air and the combustion gases, the gas mixing unit being maintained at a pressure less than the pressure within the combustion chamber during pyrolysis operations, whereby combustible gases within the combustion chamber will be continuously urged to flow toward the gas mixing means conduit interconnecting the gas mixing unit and the burner for supplying the mixture of air and combustible gases formed in the mixing means to the burner system.

DESCRIPTION OF ONE FORM OF THE INVENTION

Figure 1:
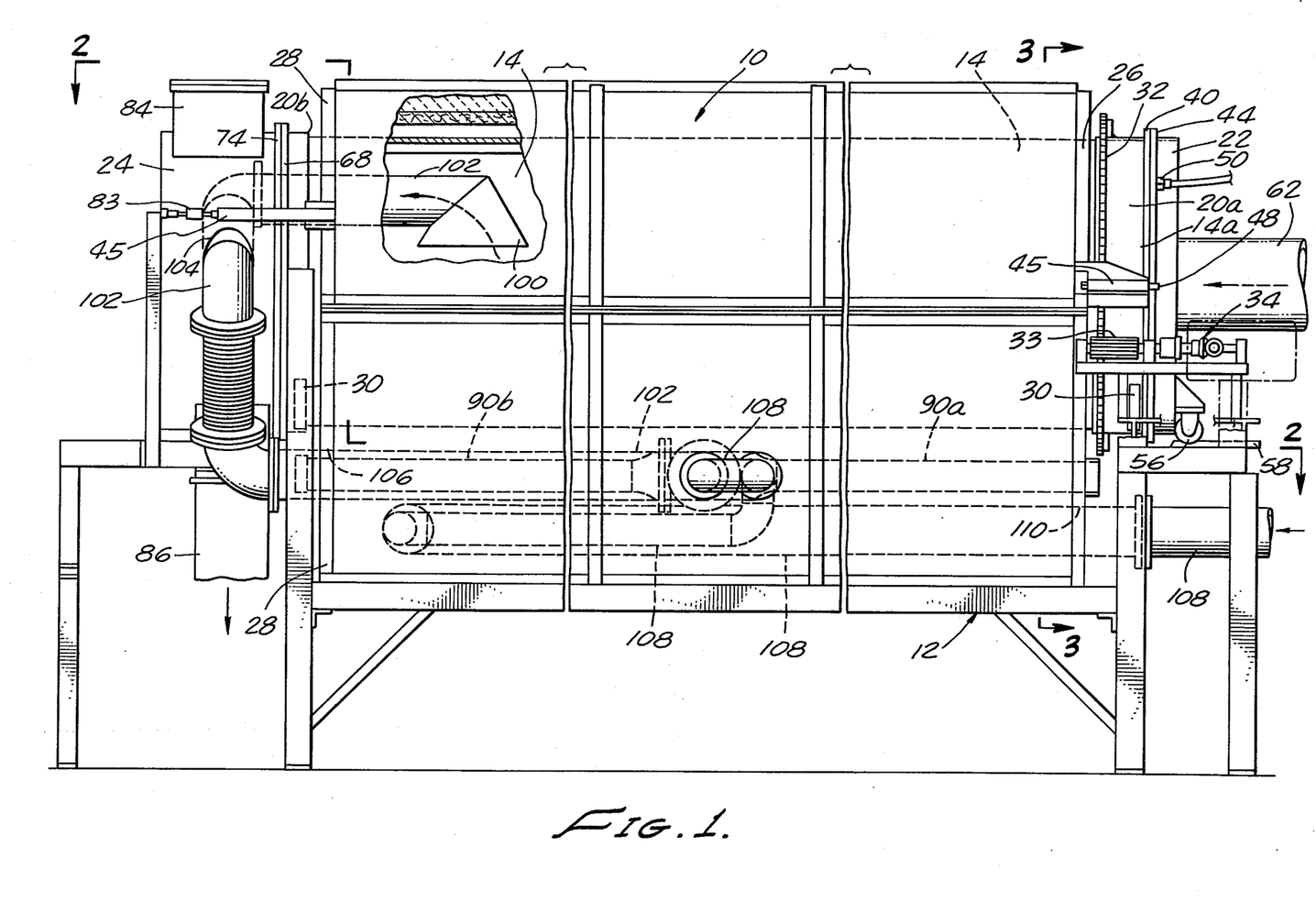
FIG. 1 is a side elevational view of the apparatus of the invention, partly broken away to show internal construction.
Figure 2:
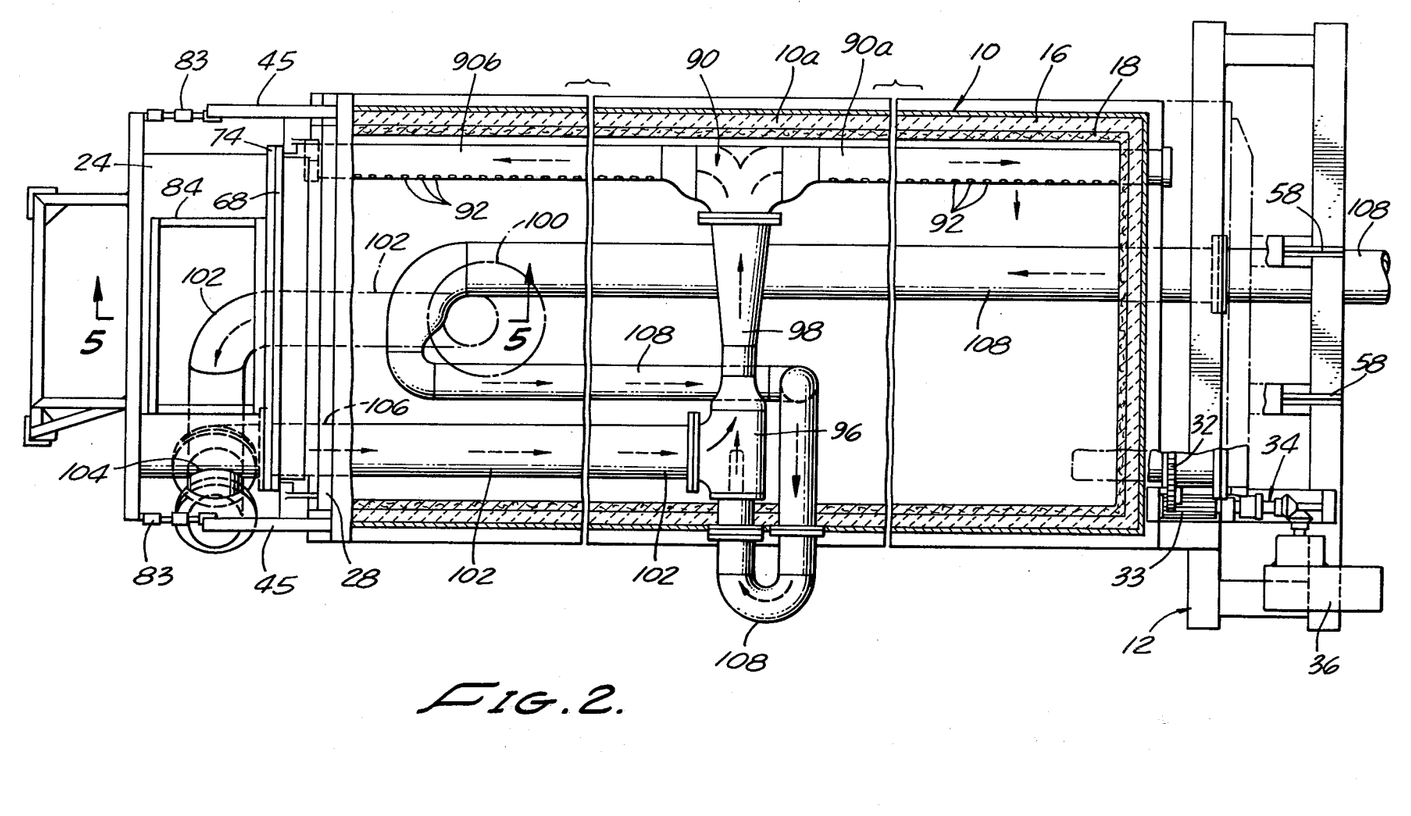
FIG. 2 is a view taken along lines 2—2 of FIG. 1.
Figure 3:
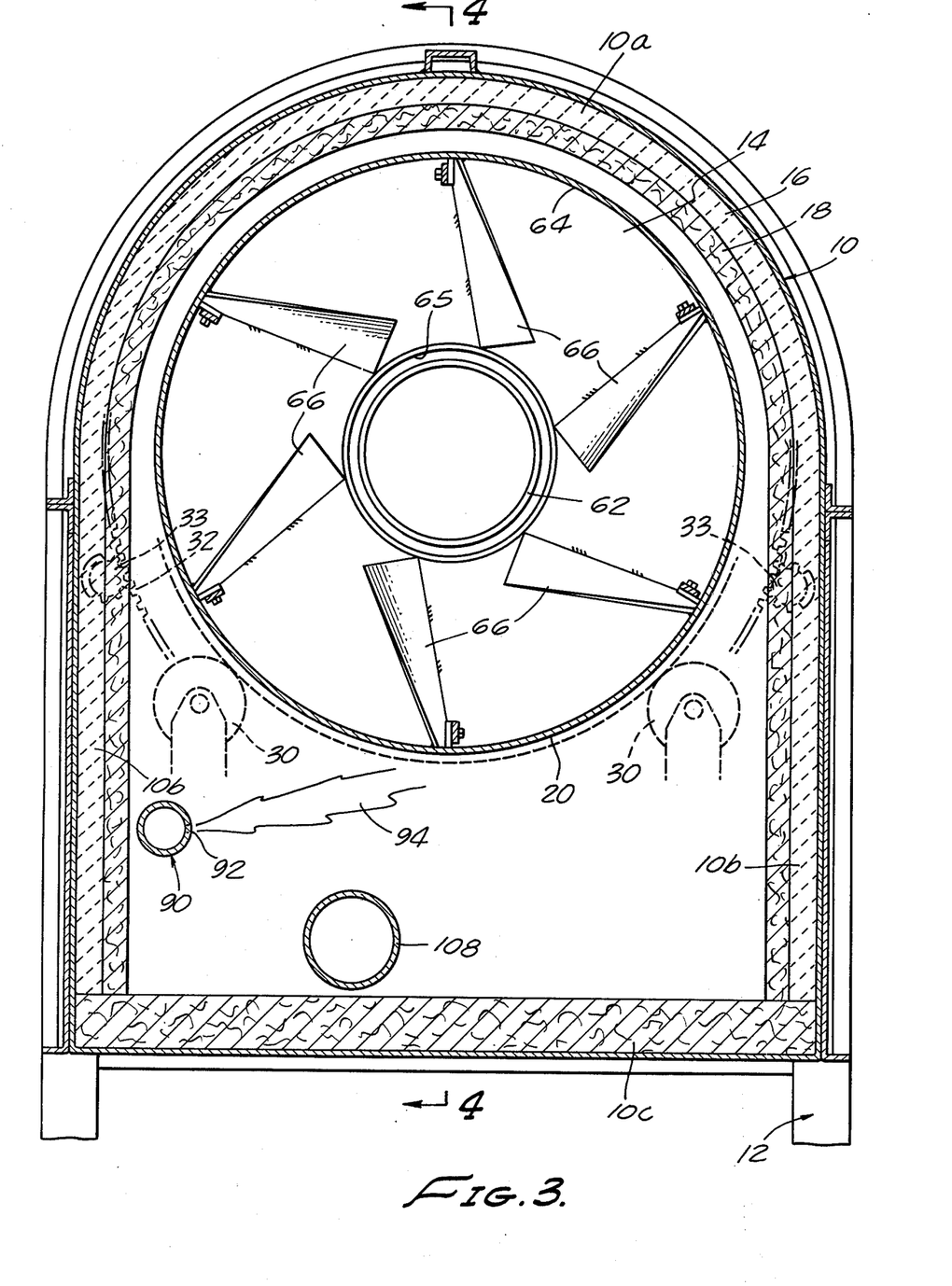
FIG. 3 is an enlarged cross sectional view taken along lines 3—3 of FIG. 1 illustrating the construction of the housing and material distribution means of the invention.

Referring to the drawings and particularly to FIGS. 1-3, the apparatus of the present invention comprises a housing 10 which is carried on a structural framework 12 and includes a cylindrical combustion chamber or retort 14 mounted within housing 10. As best seen in FIG. 3, housing 10 has an insulated arcuate top portion 10a and interconnected, insulated side and bottom walls 10b and 10c respectively. Although various types of insulation can be used to insulate the walls of housing 10, an outer lining of fire bricks 16 or the like, coupled with an inner lining of a high temperature insulation such as rock wool 18 has proven quite satisfactory.

Combustion chamber 14 comprises a rotatable tubular body portion 20 sealably closed at either end by first and second end plates 22 and 24. Body portion 20 extends longitudinally of housing 10 with the end portions thereof protruding through first and second insulated end walls 26 and 28 (FIG. 1). Body portion 20 is rotatably supported proximate its ends by transversely spaced apart support rollers 30 carried at either end of framework 12 (FIGS. 1 and 3).

A ring gear 32 is provided about the periphery of body 20 proximate its first, or inlet end 20a. As best seen in FIGS. 2 and 3, ring gear 32 is driven by transversely spaced apart pinions 33 which, in turn, are driven by a drive means comprising a gear train 34 and a variable speed motor 36 carried by framework 12. Various types of drive means, the construction and operation of which is well understood by those skilled in the art, may be used to rotate the retort at selected rates of speed appropriate for the particular application to which the apparatus is being applied.

Figure 4:
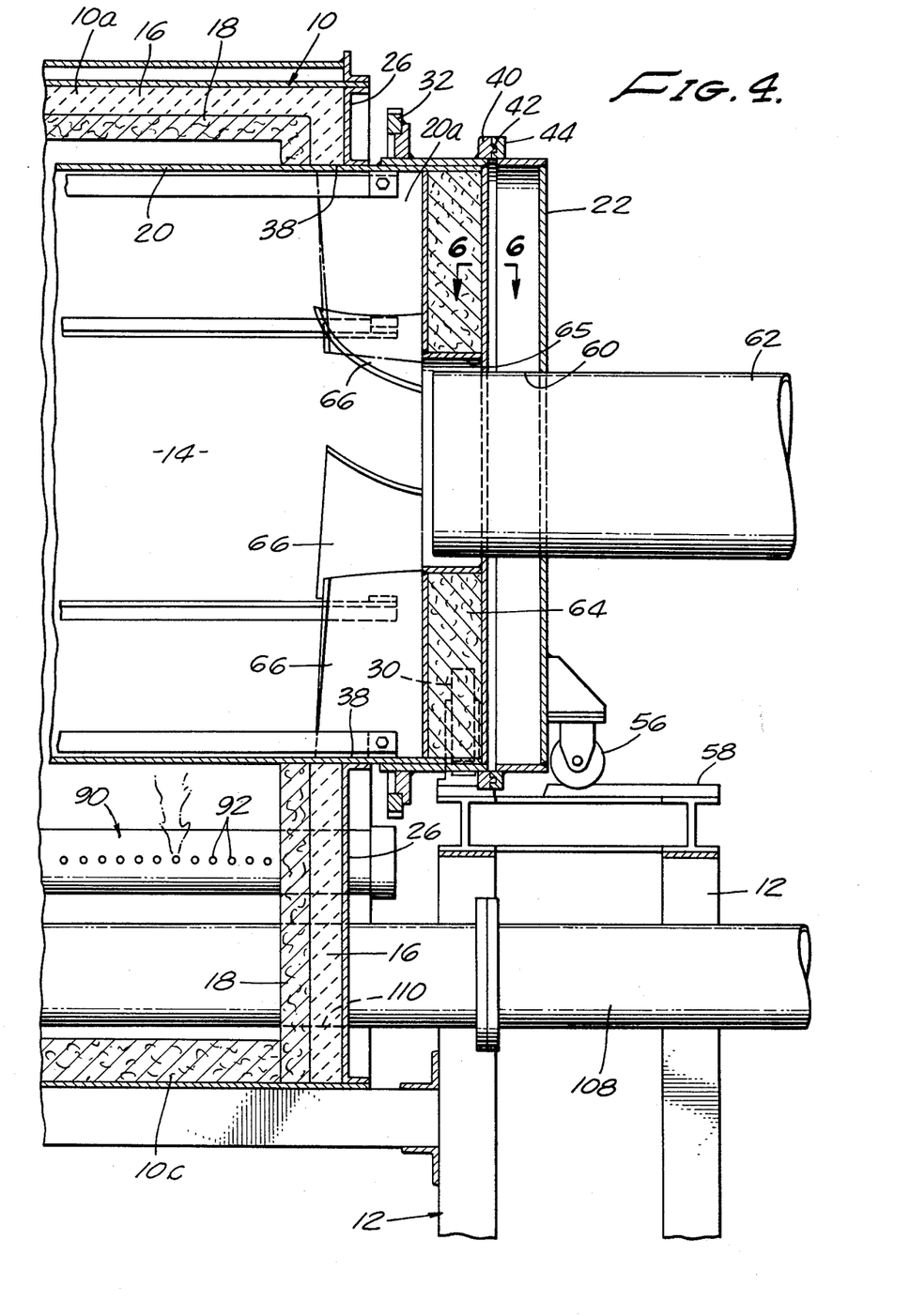
FIG. 4 is a view taken along lines 4—4 of FIG. 3 illustrating the construction of the input end of the apparatus.

Turning to FIG. 4, the inlet end 20a of the body portion of combustion chamber 14, projects through an opening 38 provided in end wall 26 of housing 10. As best seen by also referring to FIG. 6, end 20a terminates in a peripheral flange 40 having an outwardly extending circumferential tongue portion 42. Flange 40 and tongue 42 comprise parts of the liquid sealing means of the apparatus which, as will be described in detail hereinafter, functions to prevent the admittance of oxygen to, or the escape of gases from, combustion chamber 14. Also forming a part of the liquid sealing means of this form of the invention is a peripheral flange 44 provided on nonrotating first end plate 22 of body 20. Flange 44 is of the same diameter as flange 40 and is provided with a circumferential groove 46 adapted to receive tongue 42. Flange 44 has a smooth rear face 44a adapted to mate with the front face 40a of flange 40 when end plate 22 is in position to sealably close the forward end of body 20.

Figure 6:
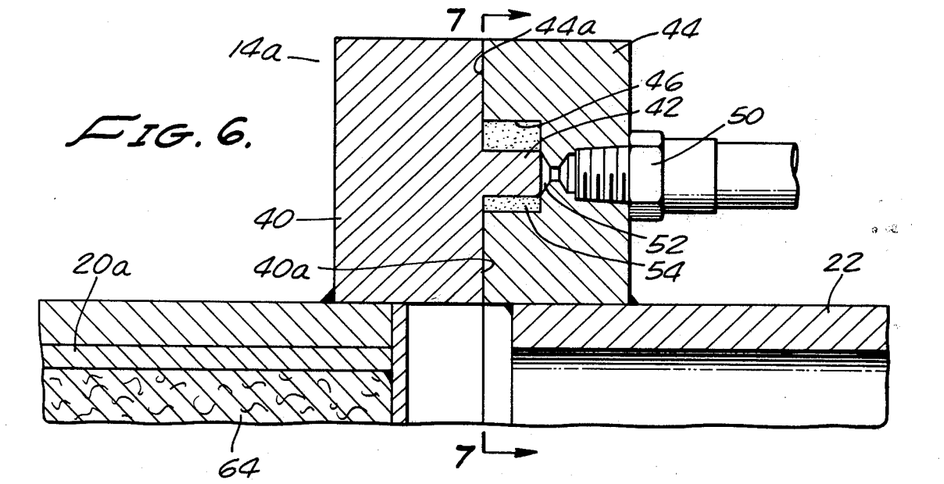
FIG. 6 is a greatly enlarged fragmentary view taken along lines 6—6 of FIG. 4 showing the construction of the liquid medium sealing means of the invention.
Figure 7:
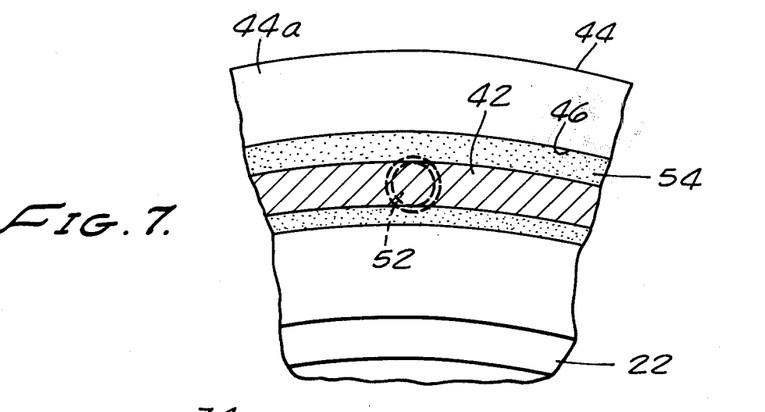
FIG. 7 is a view taken along lines 7—7 of FIG. 6.

Threadably connected to flange 44 is a liquid injection means for injecting fluid under pressure to groove 46 and between faces 40a and 44a of flanges 40 and 44. In the embodiment of the invention shown in the drawings, this injection means is provided in the form of at least one pressure fitting 50 threadably connected to flange 44. Fitting 50 has a fluid passageway in communication with a passageway 52 which, in turn, communicates with groove 46. As indicated in FIGS. 6 and 7, groove 46 is slightly wider than tongue 42 so that when a fluid 54 from a source of fluid under pressure (not shown) is injected into groove 46 through fitting 50 it will flow around tongue 42 forming, in effect, a fluid "O" ring. Various sealing fluids may be used as the sealing medium, but a heavy viscous heat resistant material such as a silicon base grease is most desirable.

With end plate 22 secured in the closed position by means of a locking means comprising fluid actuated cylinders 45 (FIG. 1), and with body 20 rotating relative to the end plate, the aforementioned sealing means effectively prevents the admittance of air into the combustion chamber and precludes the escape of gases from the forward end of the combustion chamber.

Although various arrangements may be used to removably secure end plates 22 and 24 against body portion 20 including mechanical or hydraulic clamping mechanisms, the use of fluid actuated cylinders 45 of the character shown in the drawings have proved quite satisfactory. Cylinders 45 may be air operated cylinders adapted to be attached to body portion 20 in operable association with transversely extending locking bars 48 affixed to end plate 44. A similar locking arrangement secures end plate 24 to the discharge end of body 20.

As illustrated in FIG. 4 of the drawings, so that end plate 22 can conveniently be moved longitudinally of the apparatus in a direction away from body portion 20, it is carried on rollers 56 which are adapted to roll along tracks 58 provided on supporting structure 12.

Extending through a centrally disposed opening 60 formed in end plate 22 is a refuse inlet tube 62. Tube 62 protrudes into combustion chamber 14 a substantial distance and, in a manner presently to be described, cooperates with a unique refuse distribution means which is specially designed to uniformly distribute the refuse within the combustion chamber. In the form of the invention shown in the drawings the distribution means comprises a generally cylindrically shaped member 64 affixed within the combustion chamber proximate the forward end of body 20. Member 64 has a central opening 65 aligned with the inlet tube 62 and is adapted to rotatably carry a plurality of spaced apart, substantially radially extending curved vanes 66 which project interiorly of the combustion chamber.

Figure 5:
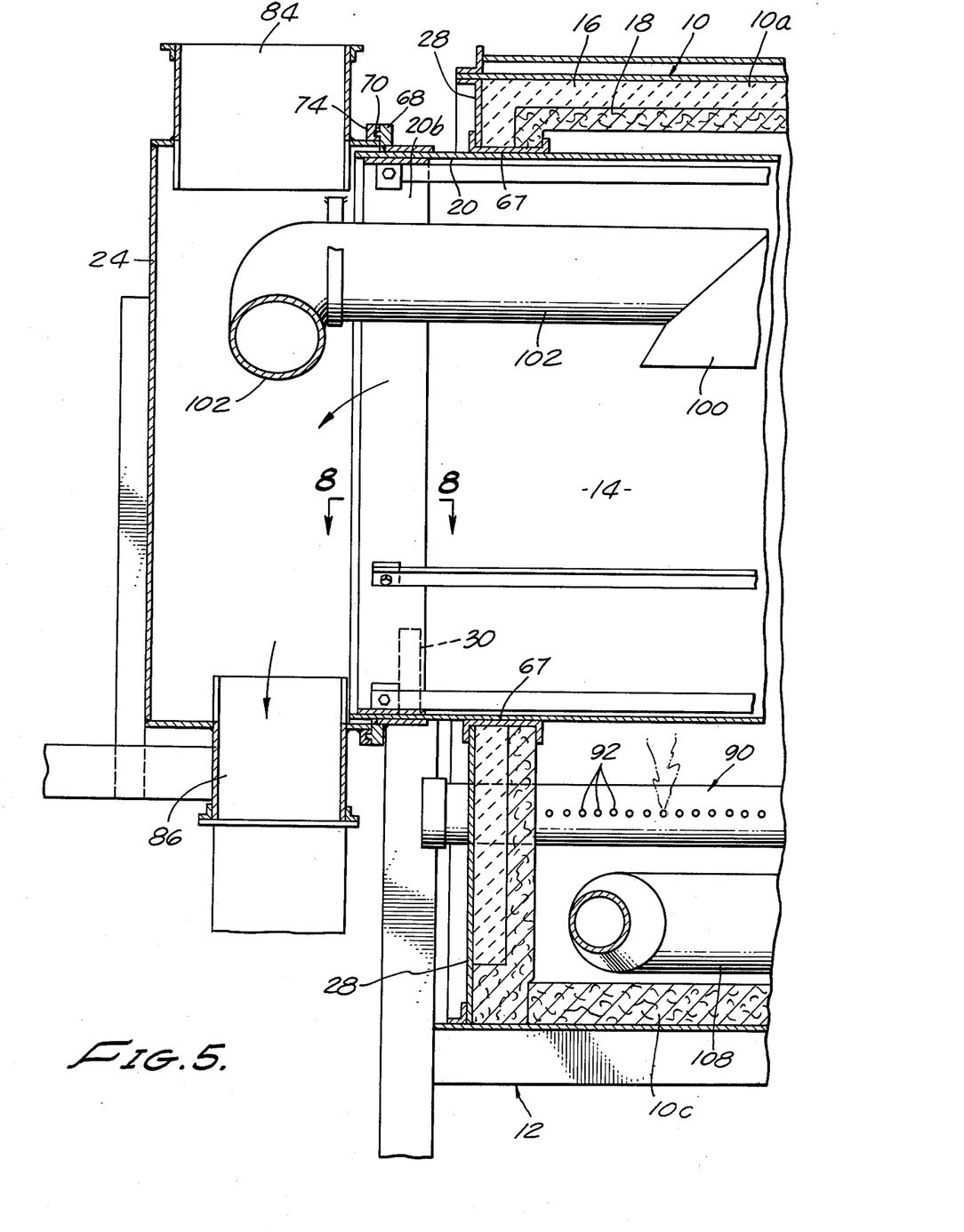
FIG. 5 is an enlarged view taken along lines 5—5 of FIG. 2 showing the construction of the discharge end of the apparatus.

Referring now to FIGS. 1 and 5 of the drawings, the discharge end 20b of the body portion of the retort or combustion chamber 14 projects through an opening 67 provided in end wall 28 of housing 10. As best seen by also referring to FIG. 8, the discharge end of body 20 of the combustion chamber terminates in a peripheral flange 68 having an outwardly extending circumferential tongue 70. Flange 68 and tongue 70 also comprise portions of the liquid sealing means of this form of the invention. Also forming a part of the sealing means, is a peripheral flange 74 formed on the previously identified end plate 24. This flange is of the same diameter as flange 68 and is provided with a circumferential groove 76 adapted to receive tongue 70. Flange 68 has a smooth rear face 68a disposed in mating engagement with the front face 74a of flange 70 when end plate 24 is in position to close the discharge end of chamber 14 in the manner illustrated in FIG. 5.

Figure 8:
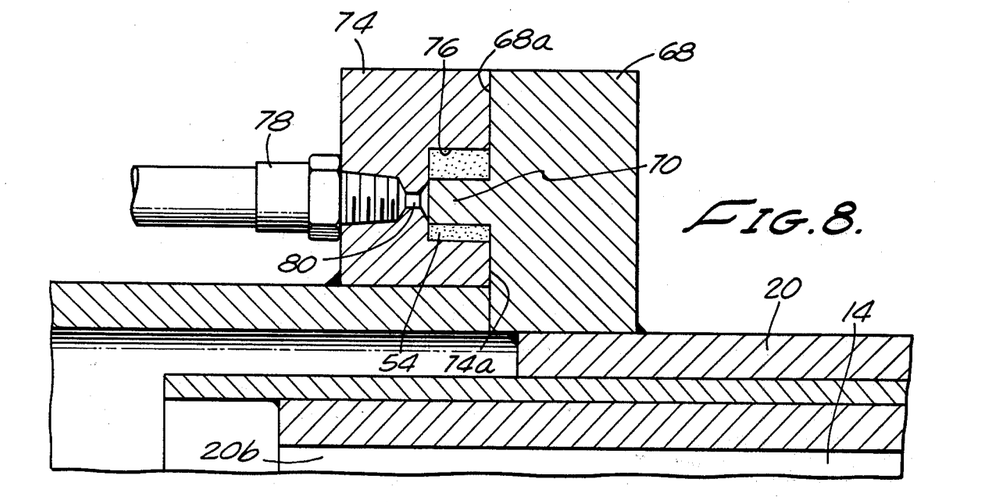
FIG. 8 is a view similar to FIG. 6 taken along lines 8—8 of FIG. 5 further illustrating the sealing means as provided at the discharge end of the apparatus.

Threadably connected to flange 74 is at least one second pressure fitting 78. Fitting 78 forms a part of the liquid injection means of the invention and includes a fluid passageway in communication with a passageway 80 which in turn communicates with groove 76. As shown in FIG. 8 groove 76 is wider than tongue 70 so that when viscous high temperature fluid 54 is injected into groove 76 through fitting 78 it will flow around tongue 70 forming, in effect, a fluid "O" ring at the discharge end of the combustion chamber. With end plate 24 in the closed position shown in the drawings and with body portion 20 rotating relative thereto, the sealing means thus described effectively prevents the admittance of air into, and the escape of gases from, the discharge end of the combustion chamber.

As seen by referring to FIG. 1, end plate 24 is held in sealable engagement with body portion 20 by fluid actuated cylinders 45 of the type previously described. Adjustment means, in the form of turnbuckles 83, are provided at the discharge end of the combustion chamber to align end plate 24 relative to body 20.

Provided at the upper periphery of end plate 24 is an exhaust duct 84 for exhausting a portion of the combustion gases from the combustion chamber either to atmosphere, to a storage tank, or to a remote combustion unit for power generation or the like. Provided at the lower end of end plate 24 is a solid material discharge port 86 for discharging solid materials such as full carbon and chemical by products from the combustion chamber.

Forming an important part of the apparatus of the present invention is a combustion gas recovery and recycling means. This means functions to capture the gases of combustion escaping from the materials being consumed in the combustion chamber and directing these gases toward a mixing chamber wherein they are mixed in precise proportions with air drawn from outside the apparatus. In a manner presently to be described, the air is controllably preheated and mixed with the combustion gases in the mixing chamber to produce a highly combustible mixture which is directed toward a burner tube 90 extending longitudinally of housing 10 and disposed rearwardly and beneath combustion chamber 14.

Referring to FIG. 2, burner tube 90 can be seen to be made up of two interconnected sections 90a and 90b which extend from the center of the unit longitudinally thereof beneath body 20 of the combustion chamber. Formed along the length of tube 90 are a multiplicity of horizontally spaced apart apertures 92. As illustrated in FIG. 3 these openings are arranged so that the burning gases 94 within tube 90 will be directed toward the underside of body 20 as it rotates within housing 20.

In the embodiment of the invention depicted in the drawings the gas recovery and recycling means comprises gas mixing means, including a gas mixing chamber 96; gas intake or recovery means for recovering gases generated within the combustion chamber and introducing them into the mixing chamber; and air intake means for receiving air from externally of the apparatus. The gas mixing means also includes connector means interconnecting the mixing means with the burner tube 90. In the present form of the invention this latter mentioned connector means is provided in the form of a frustoconically shaped tubular member 98 disposed intermediate chamber 96 and burner tube 90. The unique configuration of member 90 causes a venturi action which maintains a negative pressure within chamber 96 with respect to the pressure within chamber 14 and continuously urges the flow of gases within the gas and air intake means toward the mixing chamber.

Referring also to FIG. 1, the gas intake means of this form of the invention comprises a combustion gas intake hood 100 positioned within combustion chamber 14 and an elongated gas conduit 102 interconnecting hood 100 with mixing chamber 96. As shown in FIG. 1, conduit 102 passes through an opening 104 provided in end plate 24, downwardly outside of the combustion chamber and then inwardly into housing 10 through an opening 106 provided in end wall 28. As conduit 102 passes longitudinally of housing 10 it is positioned in close proximity with the combustion chamber so that the combustion gases flowing therethrough will be maintained at an elevated temperature of on the order of 3,000° to 4,000° F.

The air intake means of the invention comprises an elongated conduit 108 which interconnects mixing chamber 96 with external atmosphere. Conduit 108, projects through an opening 110 provided in the forward wall 26 of housing 10, extends longitudinally of the apparatus beneath the combustion chamber for substantially the entire length thereof and then doubles back for interconnection with chamber 96. Because of the novel configuration of conduit 108, the air flowing therethrough is heated by the combustion chamber to a predetermined elevated temperature of in excess of 2,000° F. which is optimum for the mixing thereof with the combustion gases flowing into the mixing chamber. Depending upon the type of materials being pyrolyzed within the apparatus, air, air enriched with oxygen, or other mixtures of gases at controllable pressures may be introduced into the mixing chamber through conduit 108.

It is to be understood that by varying the size of conduits 102 and 108, by varying the configuration of connector 98, and by using appropriate valving arrangements as may be required, the mixture of the combustion gas with air, or other externally obtained gases can be carefully controlled to produce optimum pyrolysis conditions.

OPERATION

With end plates 22 and 24 secured in a closed position against body portion 20 by fluid actuated cylinders 45, actuation of motor 36 will commence rotation of the body portion 20. During normal operations pyrolysis within the apparatus of the invention is self-sustaining. However, during initial start-up, a combustible gas, such as natural gas from an external source must be used to bring the combustion chamber, or retort up to temperature to pyrolyze the material being initially introduced into the combustion chamber. Accordingly, during start up, natural gas from a gas storage system, or any other source of natural gas is fed directly into the burner conduit 90 and ignited. As soon as the temperature of the rotating retort is sufficient to ignite the waste material and to maintain the pyrolysis thereof, the flow of natural gas to burner conduit 90 is stopped.

The waste material which is pyrolyzed within the apparatus may be in the form of wood waste from lumber mills, or it may consist of a wide variety of types of industrial and municipal waste. Typically the waste material, whatever its form, is introduced to inlet tube 62 by force of gravity from a material storage tank. The material is then fed into the combustion chamber at a controlled rate by means of a mechanically or hydraulically actuated piston adapted to reciprocate within inlet tube 62. As the waste material is fed into the combustion chamber through inlet tube 62, it will impinge upon curved vanes 66, and, as body 20 rotates, will be uniformly distributed within the interior of the combustion chamber.

During the pyrolysis of the waste material within the combustion chamber of the apparatus, a portion of the combustion gases which are generated will be drawn upwardly through hood 100 and will be carried through conduit 102 toward mixing chamber 96. At the same time, air, or a mixture of air and oxygen or other feed gas will be drawn from atmosphere, or from an external source, through conduit 108 toward mixing chamber 96. As previously discussed, the relative size and arrangement of conduits 102 and 108 result in the optimum mixing of the combustion gases and the air, or of other feed gas, to form a highly combustible gaseous mixture, which mixture is introduced into the burner system 90 through frusctoconically shaped member 98. As this highly combustible gaseous mixture burns, the flames therefrom will be directed through apertures 92 in conduit 90 along the entire bottom surface of the rotating body portion 20 of the combustion chamber. Due to the unique configuration of member 98, a venturi action is set-up whereby chamber 96 is continuously maintained at a negative pressure with respect to the ambient pressure within the combustion chamber. This negative pressure within chamber 96 causes the combustion gases, as well as the air or other feed gas, taken externally of the unit, to flow at a prescribed rate through conduits 102 and 108 respectively toward chamber 96.

Once the combustion chamber has reached operating temperature, sufficient gases of combustion will be generated within the apparatus to more than sustain the pyrolysis of material being introduced into the combustion chamber through inlet 62 and the apparatus is self sustaining.

As best seen in FIG. 2, the arrangement and configuration of conduit 108, is such that air drawn from external atmosphere and flowing through conduit 108 toward chamber 96 is heated by the heat radiated from the combustion chamber to an elevated temperature approximating the temperature of the combustion gases drawn from the combustion chamber and entering mixing chamber 96 through conduit 102. This pre-heating of the air, or other feed gas, coupled with precise control of the relative amounts of air and combustion gases being mixed, produces a highly combustible gaseous mixture. The pre-heating of the air also serves to effectively control condensation problems which would otherwise result from the condensation of water vapor in the air during gas mixing operations. Further, the preheating step serves to control the undesirable formation of crust and scale on the walls of the gas conduits and the mixing chamber which would otherwise result.

Because of the very high operating efficiency of the apparatus of the invention the quantity of combustion gases produced within the combustion chamber is sufficient not only to sustain the pyrolysis of the waste material being introduced, but also is sufficient to enable the continuous removal of a portion of these combustion gases through exhaust means 84. These surplus gases which are withdrawn from the apparatus may be introduced into a remotely located storage tank or alternatively they may be fed directly to an auxiliary energy producing unit such as a steam generator or the like.

In addition to the excess energy rich gases produced by the apparatus, energy rich materials such as char, or fuel carbon are also being continuously produced. These materials are removed from the apparatus through discharge conduit 86 and, in practice are deposited onto a conveyor system adapted to transport them to a remote location for cooling and subsequent packaging and shipment for use as energy producing fuel.

Depending upon the waste material being pyrolyzed, a wide variety of highly useful chemical material by-products such as cresotars may also be produced by the apparatus and can readily be recovered through discharge outlet 86.

During operation of the apparatus of the invention, the unique liquid sealing means for sealing the end plates of the combustion chamber to body portion 20 effectively prevents the undesirable introduction of air into the combustion chamber and at the same time, precludes the escape of combustion gases therefrom. This enables precise control of the pyrolysis of the waste materials and permits the apparatus to be set up and safely used even in populated areas.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An improved apparatus for pyrolyzing waste materials and recovering useful energy producing materials therefrom, comprising a housing, a rotatable combustion chamber mounted within said housing, a burner means for heating said chamber, a fixed waste inlet passageway mounted at a first end of said housing in communication with said combustion chamber, a fixed outlet passageway mounted at a second end of said housing in communication with said combustion chamber, the improvement comprising a combustible gas recovery and recycling means for recovering combustible gases from said combustion chamber, controllably mixing a portion of said gases with air and supplying the gaseous mixture thus formed to the burner means, said gas recovery and recycling means comprising:
  (a) combustion gas intake means for receiving combustible gases generated by the pyrolysis of the waste material within the combustion chamber;
  (b) feed gas intake means for receiving feed gases containing oxygen from externally of said apparatus, said feed gas intake means comprising heating means for heating the feed gas to a predetermined elevated temperature; and
  (c) gas mixing means disposed intermediate of, and interconnected with said combustion gas intake means and said feed gas intake means for controllably mixing the feed gas and the combustion gases, said gas mixing means, including means for supplying the mixture of combustion and feed gases to said burner means, and being maintained at a pressure less than the ambient pressure within said combustion chamber during pyrolysis operations whereby combustible gases within said combustion chamber will be continuously urged to flow toward said gas mixing means.

2. The apparatus as defined in claim 1 in which said gas mixing means comprises:
  (a) a mixing chamber in communication with said combustion gas intake means and said feed gas intake means; and
  (b) a generally frustoconical shaped tubular connector disposed intermediate said mixing chamber and the burner means.

3. The apparatus as defined in claim 1 including exhaust means for exhausting externally of said apparatus a portion of the combustible gases generated by the pyrolysis of the waste materials.

4. The apparatus as defined in claim 1 including waste distribution means mounted within said combustion chamber for receiving waste material from the waste inlet passageway and uniformly distributing it within said combustion chamber as said chamber rotates.

5. The apparatus as defined in claim 4 in which said waste distribution means comprises:
  (a) a generally cylindrically shaped member affixed within the combustion chamber proximate the first end thereof, said member having a central opening aligned with the inlet passageway; and
  (b) a plurality of spaced apart, substantially radially extending curved vanes affixed to said cylindrically shaped member and projecting interiorly of said combustion chamber.

6. An apparatus for pyrolyzing waste materials and recovering useful energy producing materials and chemical by-products therefrom, comprising:
  (a) a housing;
  (b) a combustion chamber including a rotatable body portion mounted within said housing and extending longitudinally thereof;
  (c) burner means mounted within said housing below said body portion of said combustion chamber for controllably heating said body portion;
  (d) means for rotating said body portion of said combustion chamber;
  (e) a fixed waste inlet passageway mounted at a first end of said housing in communication with said combustion chamber;
  (f) waste distribution means mounted within said body portion of said combustion chamber proximate said waste inlet passageway for receiving waste from said inlet passageway and uniformly distributing it within the interior of said combustion chamber;
  (g) a fixed outlet passageway mounted at a second end of said housing in communication with said combustion chamber;
  (h) combustible gas intake means associated with said combustion chamber for receiving combustible gases generated from the pyrolysis of the waste materials therein;
  (i) a gas mixing chamber disposed intermediate of, and in communication with, said gas intake means and said burner means, said chamber being maintained at a negative pressure with respect to the pressure within said combustion chamber; and
  (j) air supply means operably interconnected with said gas mixing chamber for drawing air from atmosphere, controllably heating the air to a predetermined elevated temperature and controllably metering said air into said gas mixing chamber.

7. An apparatus as defined in claim 6 in which said combustion chamber includes first and second end plates sealably connected to said body portion, said first end plate having a central opening therein adapted to communicate with said fixed inlet passageway and said second end plate having an opening therein adapted to communicate with said outlet passageway.

8. An apparatus as defined in claim 7 including a liquid medium sealing means for sealing said first and second end plates relative to said body portion of said combustion chamber.

9. An apparatus for pyrolyzing waste materials and recovering useful energy producing materials and chemical by-products therefrom, comprising:
  (a) a housing;
  (b) a combustion chamber including:
    (1) a generally cylindrically shaped rotatable body mounted for rotation within said housing said body having at least one open end provided with a peripheral flange portion thereon;
    (2) a first end plate mounted on said housing adapted to substantially cover said open end of said body, said first end plate having a peripheral flange thereon adapted to sealably engage said flange on said open end of said body; one of said flanges on said body and said end plate having a circumferential groove formed therein and the other of said flanges having a circumferential, outwardly extending tongue adapted to be received within said groove formed on said one flange;
  (c) means for injecting a fluid medium into said groove;
  (d) means for rotating said body portion of said combustion chamber;
  (e) burner means mounted within said housing below said body portion of said combustion chamber for controllably heating said body portion;
  (f) a fixed waste inlet passageway mounted at a first end of said housing in communication with said body of said combustion chamber;
  (g) a fixed outlet passageway mounted at a second end of said housing in communication with said body of said combustion chamber; and
  (h) a gas recovery and recycling means comprising:

(1) a gas mixing chamber;

(2) means for introducing into said mixing chamber gas generated within said combustion chamber;

(3) means for introducing air into said mixing chamber; and (4) means connecting said mixing chamber and said burner means, said mixing chamber being maintained at a negative pressure with respect to the pressure within said combustion chamber, said gas recovery and recycling means being adapted to recover combustible gases from said combustion chamber, controllably mix a portion of said gases with air and then supply the gaseous mixture thus formed to said burner means.

10. The apparatus as defined in claim 9 including means for preheating the air within said means for introducing air to said mixing chamber.

11. The apparatus as defined in claim 9 including waste distribution means mounted within said body portion of said combustion chamber for uniformly distributing waste materials within the interior of said combustion chamber.

12. An apparatus for pyrolyzing waste materials and recovering useful energy producing materials and chemical by-products therefrom, comprising:

(a) a housing;

(b) a combustion chamber including a rotatable body portion mounted within said housing and extending longitudinally thereof;

(c) burner means mounted within said housing below said body portion of said combustion chamber for controllably heating said body portion;

(d) means for rotating said body portion of said combustion chamber;

(e) a waste inlet passageway mounted at a first end of said housing in communication with said combustion chamber;

(f) an outlet passageway mounted at a second end of said housing in communication with said combustion chamber;

(g) combustible gas intake means associated with said combustion chamber for receiving combustible gases generated from the pyrolysis of the waste materials therein;

(h) a gas mixing chamber disposed intermediate of, and in communication with, said gas intake means and said burner means, said chamber being maintained at a negative pressure with respect to the pressure within said combustion chamber; and (i) feed gas intake means for receiving feed gases from externally of the apparatus and introducing them at elevated temperatures into said gas mixing chamber.

13. An apparatus as defined in claim 12 including waste distribution means mounted within said body portion of said combustion chamber proximate said waste inlet passageway for receiving waste from said inlet passageway and uniformly distributing it within the interior of said combustion chamber.

14. An apparatus for pyrolyzing waste materials and recovering useful energy producing materials and chemical by-products therefrom, comprising:

(a) a housing;

(b) a combustion chamber including a rotatable body portion mounted within said housing and extending longitudinally thereof;

(c) burner means mounted below said body portion of said combustion chamber for controllably heating said body portion;

(d) means for rotating said body portion of said combustion chamber;

(e) a waste inlet passageway mounted at a first end of said housing in communication with said combustion chamber;

(f) waste distribution means mounted within said body portion of said combustion chamber proximate said waste inlet passageway for receiving waste from said inlet passageway and uniformly distributing it within the interior of said combustion chamber;

(g) an outlet passageway mounted at a second end of said housing in communication with said combustion chamber;

(h) combustible gas intake means associated with said combustion chamber for receiving combustible gases generated from the pyrolysis of the waste materials therein;

(i) a gas mixing chamber disposed intermediate of, and in communication with, said gas intake means and said burner means; and (j) air supply means operably interconnected with said gas mixing chamber for drawing air from atmosphere and controllably metering said air into said gas mixing chamber.

15. An apparatus as defined in claim 14 in which said waste distribution means comprises a member having a plurality of spaced apart substantially radially extending curved vanes adapted to project interiorly of said combustion chamber.

* * * * *